United States Patent [19]

Arias et al.

[11] Patent Number: 4,499,202

[45] Date of Patent: Feb. 12, 1985

[54] HYDROCRACKING CATALYST

[75] Inventors: Beatriz Arias, Caracas; Humberto Kum, Los Teques; Roberto Galiasso, San Antonio de los Altos, all of Venezuela

[73] Assignee: Intevep, S.A., Caracas, Venezuela

[21] Appl. No.: 393,500

[22] Filed: Jun. 29, 1982

[51] Int. Cl.$^3$ .................. B01J 21/04; B01J 21/06; B01J 21/88; B01J 27/18
[52] U.S. Cl. .................. 502/211; 502/213; 502/242; 208/111
[58] Field of Search .............. 252/435; 208/111, 112, 208/114; 502/201, 208, 211, 213, 242

[56] References Cited

U.S. PATENT DOCUMENTS

| | | | |
|---|---|---|---|
| 2,454,056 | 11/1948 | Greger | 502/208 |
| 3,044,964 | 7/1962 | Morrell | 252/435 |
| 3,214,388 | 10/1965 | Calvert | 502/208 |
| 3,222,297 | 12/1965 | Allegrini et al. | 502/208 |
| 3,819,509 | 6/1974 | Wolk et al. | 208/251 H |
| 4,102,822 | 7/1978 | Mulaskey | 252/439 X |
| 4,217,206 | 8/1980 | Nongbri | 208/251 H |

*Primary Examiner*—W. J. Shine
*Attorney, Agent, or Firm*—Baker & McKenzie

[57] ABSTRACT

The invention relates to a particular method for the preparation of a hydrocracking catalyst, using a high iron content bauxite as a basis. This bauxite is ground and screened to a specific size and mixed with three types of additives: a promoter additive of the P, Mo, Co, Ni, W type. A hardener additive of the phosphoric acid type, ammonium phosphate. And a lubricant and pore-generating additive of the polyvinyl alcohol, polyethylene-glycol, starch type. The particularity consists in that the three additives are added simultaneously during the extrusion of the sample. That way, a particular surface composition is obtained which allows for the activity of the catalyst. Extruded products are obtained in sizes of ⅛, 1/16, and 1/32" and submitted to drying and calcination programs for their activation.

The obtained catalyst offers a good mechanical strength, a high content in macropores and a high activity, specifically for the hydrocracking of heavy Venezuelan crudes or residues.

5 Claims, 4 Drawing Figures

EXAMPLE 1
CONTINUOUS PLANT ACTIVITY (BENCH SCALE)

EXAMPLE 3
CONTINUOUS PLANT ACTIVITY (BENCH SCALE)

HYDROCRACKING CATALYST

SCOPE OF THE INVENTION

This invention relates to the method for the preparation of a hydrocracking catalyst for heavy crudes, with good mechanical strength, which at the same time is stable, active and selective. The catalyst may be used for the hydrocracking of heavy Venezuelan crudes and/or atmospheric residues and/or vacuum residues, all these batches with a high content in vanadium and asphaltenes, such as the Cerro Negro, Morichal, Suata, Irapa Base, Boscan crudes, etc.

The catalyst consists of a basic, Bauxite type material, which is activated with at least three types of additives and promoters. The invention relates to a particular combination of these additives to furnish a surface composition of active phases with at least $Fe_2O_3$, $MoO_3$, $P_2O_5$, $Al_2O_3$, $SiO_2$, $TiO_2$, which are present in the catalyst.

DESCRIPTION OF THE PRIOR ART

Materials of the Bauxite type have been suggested and used in different processes as supports, catalysts or contact materials.

Thus, in U.S. Pat. No. 3,322,665 a method is claimed, wherein liquid and gaseous reagents are placed in contact with two different contact solids, each one of these solids having different specific functions. The process may be used for different types of reactions, for example for the hydrogenation of hydrocarbons; the solids they contact are, on the one hand alumina or silica alumina, promoted with metals of groups VI b and VIII and on the other hand, materials of the Bauxite, silica gel, clay, boron alumina, silica-magnesia and other types. In this case the type of materials (bauxites, clays) are mentioned very generally and no major data about the form of utilization, or form of activation or of the surface composition of bauxites are given.

In other patents methods are claimed wherein two zones of hydrotreatment appear, in each of which one reaction preferably is conducted. Thus in the U.S. Pat. No. 3,819,509 the form of obtaining low sulfur content fuel oil is offered from a petroleum residue with a high metal content. For the first reaction zone in which a hydro demetallization (HDM) is carried out, a bauxite or activated alumina is used. The mass composition of the mentioned bauxite is $Al_2O_3 = 72–76\%$, $Fe_2O_3 = 10–18\%$, $TiO_2 = 4\%$, $SiO_2 = 5–9\%$. For the second reaction zone, in which a hydro desulfurization (HDS) is carried out, conventional Co—Mo/$Al_2O_3$ catalysts are used. In contrast with our invention the activation method of bauxite is not mentioned, nor is there any promotion with additional metals to obtain a surface compound.

U.S. Pat. No. 3,901,792 discusses likewise two reaction zones for the demetallization and desulfurization of crude or atmospheric residue. In the reaction zone for the demetallization, the commercial bauxite, called Porocel, is used specifically.

This Porocel bauxite is also used in U.S. Pat. No. 3,964,995 for a hydro desulfurization method. In this process the used catalyst is going to be replaced, and it is claimed that by increasing the replacement speed of the catalyst, the selectivity of the reaction is improved and the hydrogen consumption is reduced.

Bauxite is likewise used in U.S. Pat. No. 3,893,911 for the demetallization of batches with a high metal content, but here the basis of the invention consists of operating the reactor in a boiling bed and in the continuous regeneration and replacement of the catalyst. It is stressed that the costs can be reduced by using bauxite, Porocel being particularly preferred, because it is said to be more active than porous aluminum oxide. As we said here, the invention relates to the process and not to the catalyst which moreover offers no special type of activation; neither is the surface composition it presents, being described.

In U.S. Pat. No. 4,217,206 bauxite + 1% Mo is used for the demetallization of Venezuelan crudes. The method of increasing the speed of the catalyst is claimed to control the initial demetallization speed at values not higher than 75%. The conversion of residues as a most important objective is not claimed.

The foregoing patent does not specify the method of preparation of the catalyst. Neither are other additives mentioned as present, nor the composition of the surface of the catalyst.

The hydro conversion of hydrocarbons is effected in U.S. Pat. No. 4,196,072, using poly acids, including Mo or W, and they are mixed with phosphoric acid as catalysts. In this case, on the contrary, neither bauxites nor similar materials are used.

The general objective of this patent is a particular method for the preparation of a hydrocracking catalyst, using a high iron content bauxite as a base, but which in contrast with the patents mentioned before also contains: promoter additives of the P, Mo, Co, Ni type; hardener additives of the phosphoric acid, ammonium phosphate type, etc; lubricating and pore-generating additives of the polyvinyl alcohol starch, polyethylene glycol type. Using a particular combination of preparatory steps, a particular surface composition is obtained which allows for the activity of the catalyst. The latter offers a high mechanical strength, a high content in macropores and a high specific activity for the hydrocracking of Venezuelan heavy crudes or residues.

SUMMARY OF THE INVENTION

The invention consists specifically of a particular method for the preparation of a hydrocracking catalyst, wherein a bauxite with a high iron content is ground and screened to a specific size. Then this bauxite is mixed with three types of additives: the promoting additive, the hardening additive and the lubricating and pore-generating additive. The particularity consists of the fact that the three additives are added simultaneously during the extrusion of the sample. Extrusion products are obtained in sizes of ⅛, 1/16 and 1/32" and submitted to drying and calcination programs for their activation. Finally, a catalyst is obtained with a particular surface composition.

DETAILED DESCRIPTION OF THE INVENTION

Figure 1:
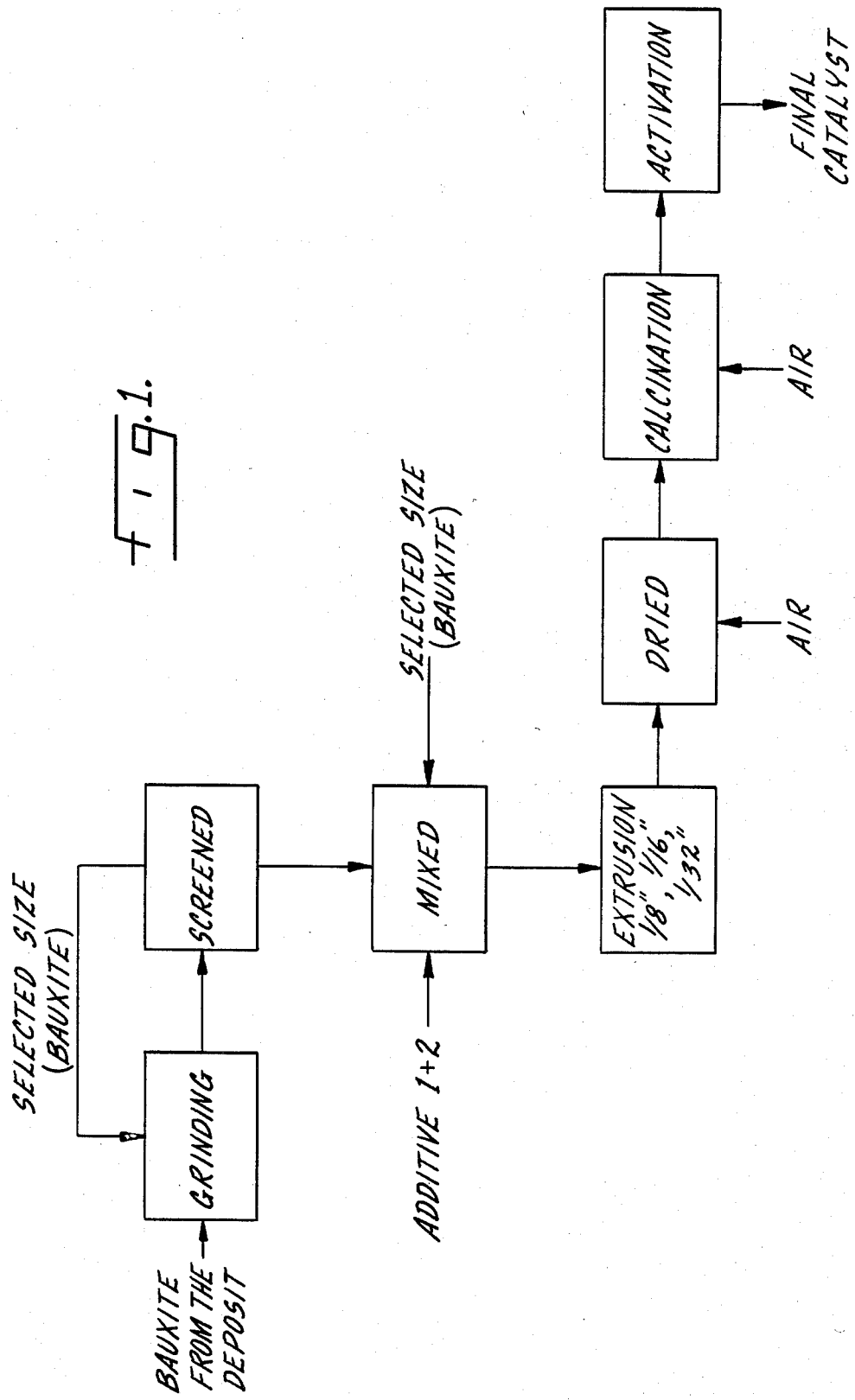
FIG. 1 is a flow diagram showing the steps for making a hydrocracking catalyst of this invention.

This invention relates to the preparatory method of a hydrocracking catalyst whose particularity is based on the simultaneous impregnation, redispersion and extrusion, without going through intermediate steps (FIG. 1).

The basis material is a bauxite with a high iron content, whose chemical massic composition is in the following range:
- Al = 22–47%
- Fe = 5–28%
- Si = 1–13%
- Ti = 1–5%

This sample is ground and screened to a size of less than 150 microns or less than 500 microns. Three different types of additives are added to the bauxite:

1. A hardener additive: preferably phosphoric acid in quantities from 1–8% as phosphate, but ammonium phosphate or aluminium phosphate also may be used.
2. A promoter additive which preferably is molybdenum in quantities from 1–5%, but nickel or cobalt also may be used in the same concentration and the already mentioned phosphorous.
3. A lubricating and porosity-generating additive which preferably is starch in quantities from 3–10%, polyvinyl alcohol or polyethylene glycol also may be used in the same quantities.

The sequence of preparation is as follows: A molybdenum salt, preferably technical grade ammonium heptamolybdate (in adequate quantities) is dissolved in a phosphoric acid solution of such a quantity that the desired percentage of phosphate is obtained. This solution is added to the ground bauxite and in addition the necessary quantity of starch and water is added to obtain the required values of additives. Then this entire paste is homogenized by means of a mixture during a variable time to adjust the rheology of the paste for its extrusion.

During the extrusion phase it is necessary to control the extrusion pressure at values of less than 50 kilograms/pellet and the temperature must be between 30 and 40° C. (86 and 104° F.).

After the extruded products are obtained they must be dried and calcinated for the activation of the catalyst. The method used is as follows:

Drying at ambient or room temperature for periods from 8 to 72 hours, in order to achieve an adequate evaporation without crack formation.

Stove-drying at temperatures of from 60 to 120° C. (140 to 248° F.) for periods from 8 to 72 hours to start the formation of pseudo bohemite and start the surface reactions with the basic material.

A calcination in ovens at temperatures ranging from 300° C. to up to 600° C. (572 to 1112° F.) for periods ranging from 3 to 24 hours, to generate a large numer of pores in sizes higher than 100 A; said pores must be interconnected adequately. The calcination method which is preferred is elevate the sample up to 500° C. (932° F.) at a heating speed of 5° C./minute up to 500° C. and then hold it at this temperature for 8 hours. The speed of the air must be such that the heat transfer coefficient is higher than 15–40 Kcal/hour m² °C. Then the characterstics of the obtained catalyst are as follows: The chemical composition on the whole is within the following ranges:

|  | and preferably |
|---|---|
| 25–35% Al | 25–30% Al |
| 5–15% Fe | 7–12% Fe |
| 1–10% Si | 1–5% Si |
| 0.63–5% Ti | 1–3% Ti |
| 1–10% Mo | 1–10% Mo |
| 1–8% P | 2–4% P |

The physical characteristics are within the following ranges:
- Surface Area = 90–250 m²/gram
- Pore volume = 0.25–0.55 cc/gram
- Real Density = 3.00–5.00 grams/cc
- Apparent Density = 1.50–2.00 grams/cc
- Mechanical Strength of the pellet = 2–12 kg/pellet
- Resistance to abrasion = 0–2% fines
- $V_P$ Radius > 200 A = 45–65%
- $V_P$ Radius > 1000 A = 20–40%

The special characteristics of the catalyst reside in its surface composition, presented as atomic ratios between the elements, determined by surface analysis by XPS, in a Physics Electronics equipment using the relation of intensities of the corresponding bands at:

| Mo = 3d 5/2 | Al = 2p | Ti = 2p 3/2 |
|---|---|---|
| Fe = 2p 3/2 | Si = 2p 3/2 | P = 2p |

This surface composition is located in the following ranges:

|  | and preferably |
|---|---|
| Mo/Al = .03–.09 | Mo/Al = .04–.07 |
| Fe/Al = .06–.15 | Fe/Al = .08–.12 |
| Si/Al = .08–.30 | Si/Al = .10–.20 |
| Ti/Al = .01–.03 | Ti/Al = .01–.02 |
| P/Al = .10–.60 | P/Al = .15–.50 |

The catalyst presents a conversion greater than 50% of residues at temperatures from 410°–420° C., pressure 2000 psi and time of sojourn of 2 hours, in an agitated tank reactor, during times exceeding one month, without showing any important deactivation. At the same time a demetallization of more than 60% and a desulfurization of more than 50% by weight are obtained. The formation of carbon in the used catalyst is less than 15% by weight.

EXAMPLES

Below a few examples are shown to illustrate the invention, but in no case do they limit the invention:

EXAMPLE 1

5000 grams Bauxite PJ-1 (Pijiguaos-Venezuela deposit) are ground and screened to a size of less than 150 microns, mixed with 500 grams commercial starch, and homogenized for 2 hours in a powder mixer. A solution is prepared by mixing 460 grams technical ammonium heptamolybdate in 650 cc water with 280 grams orthophosphoric acid (85%, 1.77 cc) in 500 cc water. The resulting solution is added to the previous mixture of Bauxite + starch and the paste remains for 15 minutes in a mixer. Additional water is added until the paste presented a rheology appropriate for its extrusion. The total volume of the added liquid was 1160 cc. It was left in the kneader for another 15 minutes. The paste was passed through the extruder at intermediate speed and extruded products of 1/16" were obtained.

The drying process took 48 hours at ambient temperature + 8 hours at 100° C. (212° F.). The calcination was carried out by raising the temperature up to 500° C. at a rate of 5° C./minute, then it was held at this temperature for 17 hours.

The chemical composition of the resulting catalyst was as follows:
  Al = 28.00%
  Fe = 10.29%
  Si = 1.85%
  Ti = 0.67%
  Mo = 5.08%
  P = 2.28%

The obtained surface composition was:
  Mo/Al = 0.07
  Fe/Al = 0.11
  Si/Al = 0.27
  Ti/Al = 0.01
  P/Al = 0.46

The characteristics obtained in the catalyst were:
  Surface Area = 125 m²/gram
  Pore volume = 0.31 cc/gram
  Real Density = 2.52 grams/cc
  Apparent Density = 1.69 grams/cc
  Mechanical Strength of the pellet = 7.39 kg/pellet
  Resistance to abrasion = 0.06 fines
  $V_P$ Radius > 200 A = 51.29%
  $V_P$ Radius > 1000° A = 23.55%

The activity tests were carried out in two types of units:

(i) In an autoclave for initial activity tests, at the following conditions:
  Pressure: 1500 psi
  Time: 60 minutes
  Agitation: 1000 rpm (ii) In a unit for continuous hydro treatment (tricked bed reactor) to carry out stability tests during periods of one week, under the following conditions:
  Temperature: 410° C.
  Pressure: 1500 psi g
  LHSV: 0.5 v/v/hour
  $H_2$/batch: 800 Nm³/m²

In both cases the batch used was Morichal Crude with the following characteristics:
  API: 11°
  S: 2.8%
  V: 321 ppm
  Asphaltenes: 9.7%

The results in the autoclave, with the previously indicated batch and conditions were:
  HDS: 48%
  HDV: 83%
  API: 21.7°
  %Δ(°API) 92.27
  C/used catalyst 8.70%

Figure 2:
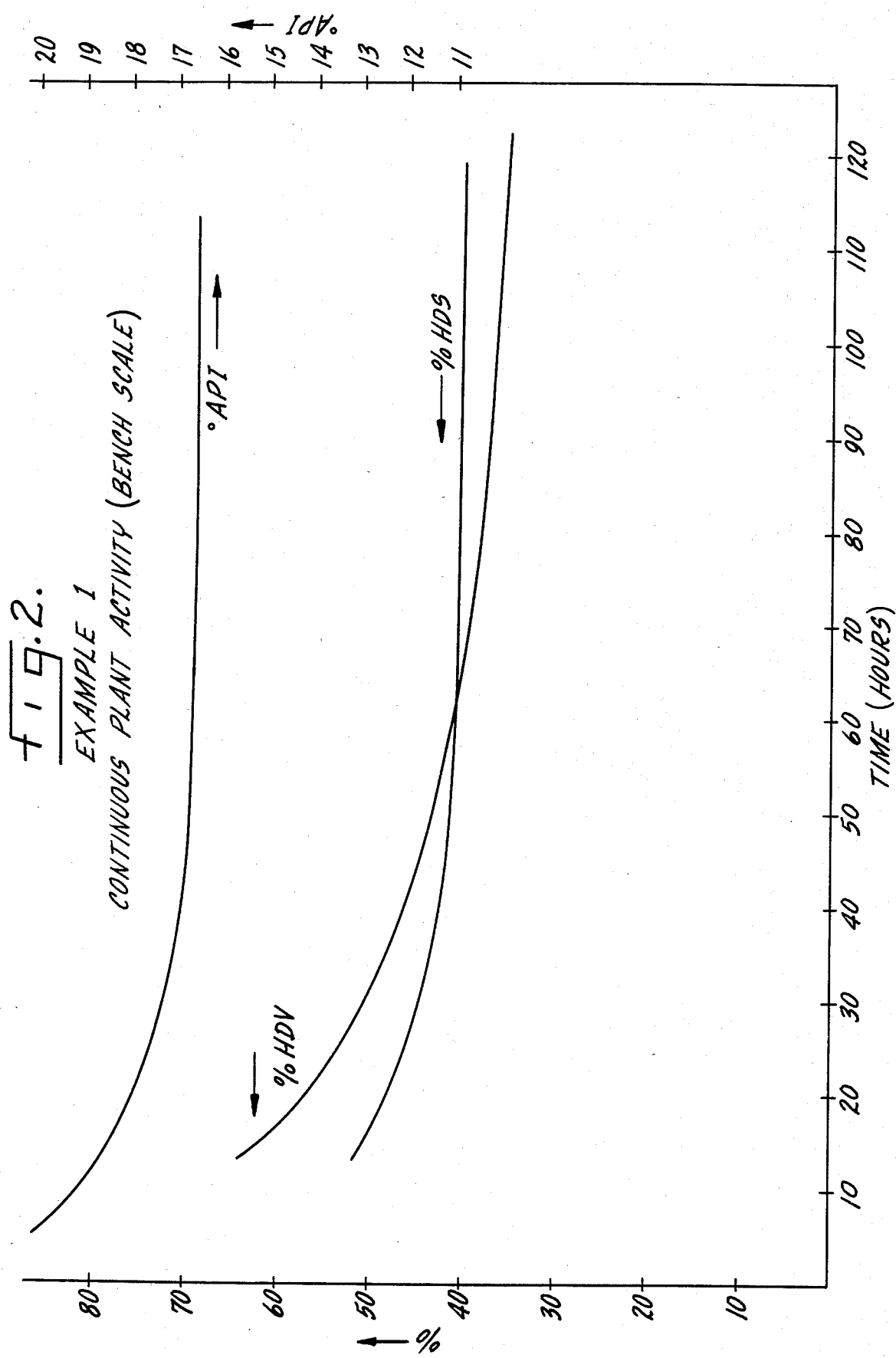
FIG. 2 is a graphical representation of catalyst activity for the catalyst prepared as described in Example 1.

The results of activity in the continuous unit at bench scale are shown in FIG. 2.

Results of the distillation D-1160: 65% (P). Distillates 500° C. (−).

EXAMPLE 2

1000 grams bauxite PJ-1 (Pijiguaos-Venezuela Deposit) ground and screened to a size of less than 150 microns are mixed with 100 grams commercial starch, homogenized for 2 hours in a powder blender. A solution was prepared mixing 46 grams technical ammonium heptamolybdate in 65 cc water with 55 cc orthophosphoric acid (85%, 1.77 grams/cc) in 100 cc water. The resulting solution was added to the previous mixture of bauxite + starch, the paste remaining for 15 minutes in a mixer. Additional water was added until the paste showed a good rheology for the extrusion. The total volume of added liquid was 235 cc. It was left in the kneader for another 15 minutes. The paste was passed through the extrudor at a minimum speed, with 1/16" extrusion products obtained.

The drying process lasted 72 hours at ambient temperature + 16 hours at 120° C. (248° F.). Calcination lasted 3 hours at 300° C. + 3 hours at 500° C.

The chemical composition of the resulting catalyst was:
  29.46% Al
  11.18% Fe
  1.62% Si
  0.74% Ti
  2.75% Mo
  2.65% P The surface characteristics obtained were:
  Mo/Al = 0.05
  Fe/Al = 0.12
  Si/Al = 0.09
  Ti/Al = 0.01
  P /Al = 0.47

The physical characteristics were:
  Surface Area = 151 m²/gram
  Pore volume = 0.31 cc/gram
  Real Density = 2.52 grams/cc
  Apparent Density 1.69 grams/cc
  Mechanical strength of the pellet = 3.73 kg/pellet
  $V_P$ Radius > 200° A = 51.43%
  $V_P$ Radius > 1000° A = 26.57%

The activity test results in the autoclave at the conditions and batches mentioned in example N° 1 were:
  HDS = 36.00%
  HDV = 56.00%
  API = 19.9°
  %Δ(°API) = 80.90
  C of catalyst used = 9.64%

Figure 3:
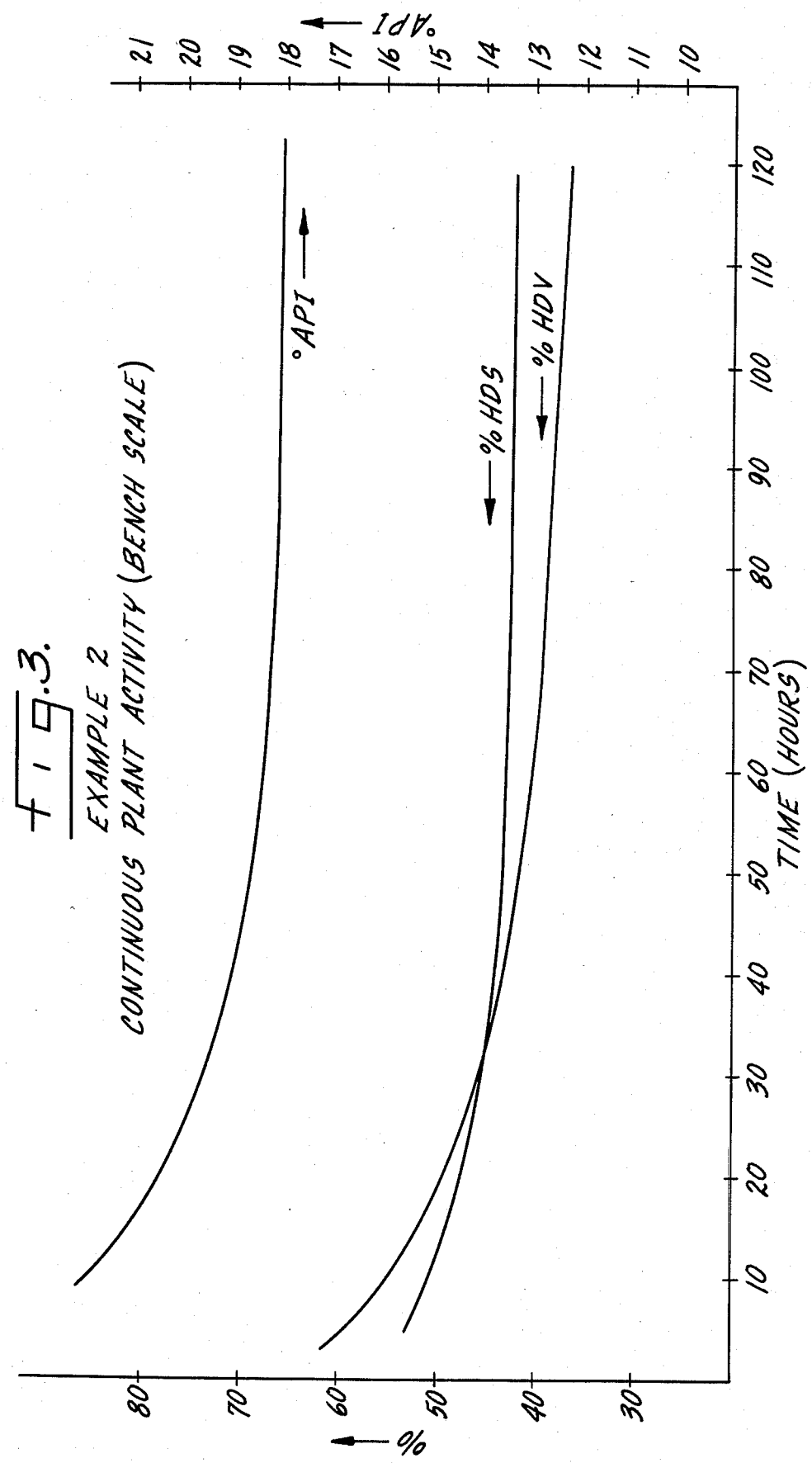
FIG. 3 is a graphical representation of catalyst activity for the catalyst prepared as described in Example 2.
Figure 4:
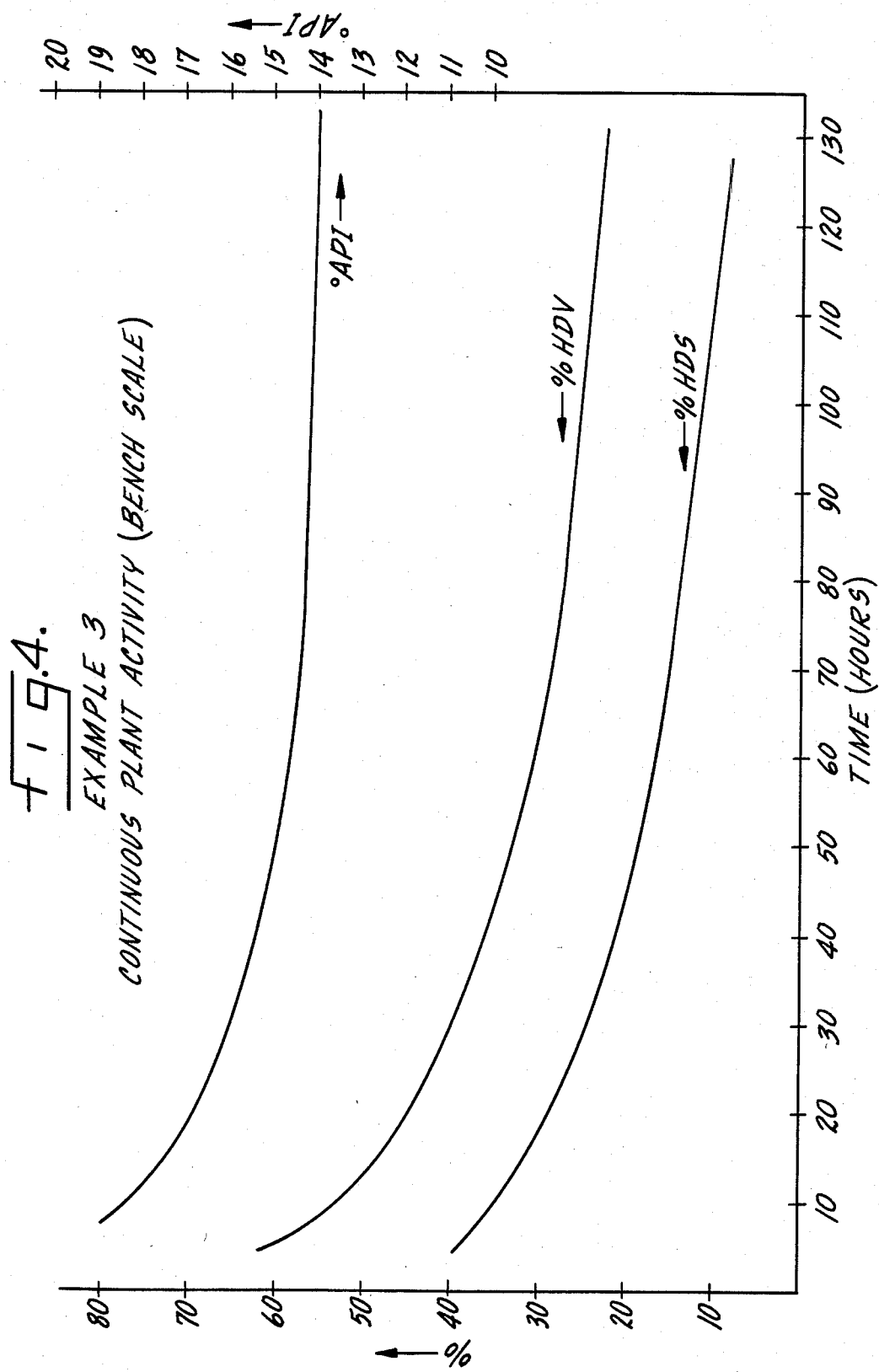
FIG. 4 is a graphical representation of catalyst activity for the catalyst prepared as described in Example 3.

The activity results in the continuous unit at bench scale are shown in FIG. 3.

Results of the Distillation D = 1160: 70% distillates 500° C.(−).

EXAMPLE 3

500 grams Bauxite Pj-1 (Los Pigiguaso-Venezuela Deposit) in a size below 150 microns are mixed with 50 grams commercial starch, being homogenized for 2 hours in a powder mixer. A solution of 28 cc $H_3PO_4$ phosphorous acid (85%, 1.77 gr/cc) is added in 50 cc water. The paste remains for 15 minutes in a kneader. Additional water was being added until the paste showed a good rheology for the extrusion. The total volume of added liquid was cc. The paste was left in the mixer for another 15 minutes.

The paste was passed through the extruder at minimum speed with extrusion products of 1/16" being obtained.

The drying process was carried out at room temperature for 72 hours + 16 hours at 100° C. The calcination lasted 24 hours at 300° C + 16 hours at 500° C.

The chemical composition of the resulting catalyst was:
  28.32% Al
  10.06% Fe 1.64% Si
0.87% Ti
2.48% P The surface composition of the catalyst obtained was:
Fe/Al = 0.11
Si/Al = 0.08
Ti/Al = 0.01
P /Al = 0.30

The physical conditions of the catalyst obtained were:
Surface area = 140 m$^2$
Pore Volume = 0.30 cc/gram
Real Density = 3.35 grams/cc
Apparent" = 1.66 grams/cc
Mechanical strength of the pellet = 2.10 kg/pellet
$V_P$ Radius > 200 A = 16.66%
$V_P$ Radius > 1000 A = 5.33%

The activity test results in the autoclave with the previously mentioned batch and conditions were:
HDS = 24.00%
HDV = 27.00%
(°API)18.00%
C per used catalyst: 10.5%

EXAMPLE 4

500 grams Bauxite PJ-1 (Los Pijiguaos-Venezuela deposit) in a size of less than 150 microns are impregnated with a technical ammonium heptamolybdate solution of 12 grams in 625 cc water. After 3 hours in contact the excess liquid is removed and the sample is dried for 16 hours in the stove at 120° C. and calcinated for 8 hours at 550° C.

The chemical composition of the resulting catalyst was:
30.03% Al
9.93% Fe
1.92% Si
0.63% Ti
4.68% Mo The surface condition of the resulting catalyst was:
Mo/Al = 0.05
Fe/Al = 0.11
Si/Al = 0.15
Ti/Al = 0.01

The resulting physical characteristics were:
Surface area = 178 m$^2$/g
Pore volume = 0.31 cc/g
Real density = 4.59 g/cc
Apparent" = 1.88 g/cc
Vp radius > 200 A = 20.13%
Vp radius > 1000 A = 8.12%

The activity test results in the autoclave showed that this catalyst was much less active, so that the test conditions were changed as followed:
Temperature: 420° C.
Pressure: 2000 psi
Agitation: 1250 rpm Then the activity as presented was:
HDS = 35.00%
HDV = 65.00%

We claim:

1. A hydrocracking catalyst in pellet form, having a surface area of about 90 to about 250 square meters per gram, a pore volume of about 0.25 to about 0.55 cubic centimeters per gram, real density of about 3.00 to about 5.00 grams per cubic centimeter, and apparent density of about 1.50 to about 2.00 grams per cubic centimeter;
   containing aluminum in an overall concentration of about 25 to about 35 weight percent;
   containing iron in an overall concentration of about 5 to about 15 weight percent;
   containing silicon in an overall concentration of about 1 to about 10 weight percent;
   containing titanium in an overall concentration of about 0.63 to about 5 weight percent; and
   containing a promoter which is a member of the group consisting of molybdenum and phosphorus or mixture thereof, said molybdenum, if present, being present in an overall concentration of about 1 to about 10 weight percent and said phosphorus, if present, being present in an amount of about 1 to about 8 weight percent;
   the catalyst pellet surface concentration of said promoter being higher than the overall concentration of said promoter; the atomic ratio of molybdenum to aluminum at the pellet surface being in the range of about 0.03 to about 0.09 when molybdenum is present in the catalyst; and the atomic ratio of phosphorus to aluminum at the pellet surface being in the range of about 0.10 to about 0.60 when phosphorus is present in the catalyst.

2. The hydrocracking catalyst in accordance with claim 1 wherein the promoter is molybdenum and the atomic ratio of molybdenum to aluminum at the catalyst pellet surface is in the range of about 0.04 to about 0.07.

3. The hydrocracking catalyst in accordance with claim 1 wherein the promoter is phosphorus and the atomic ratio of phosphorus to aluminum at the catalyst pellet surface is in the range of about 0.15 to about 0.50.

4. The hydrocracking catalyst in accordance with claim 1 wherein the promoters present are molybdenum and phosphorus, the atomic ratio of molybdenum to aluminum at the catalyst pellet surface is in the range of about 0.03 to about 0.09, and the atomic ratio of phosphorus to aluminum at the catalyst pellet surface is in the range of about 0.10 to about 0.60.

5. The hydrocracking catalyst in accordance with claim 1 containing aluminum in an overall concentration of about 25 to about 30 weight percent, containing iron in an overall concentration of about 7 to about 12 weight percent, containing silicon in an overall concentration of about 1 to about 5 weight percent, containing titanium in an overall concentration of about 1 to about 3 weight percent, containing molybdenum in an overall concentration of about 1 to about 10 weight percent, and containing phosphorus in an overall concentration of about 2 to about 4 weight percent.

* * * * *